United States Patent
Ballard, Jr. et al.

(10) Patent No.: US 9,963,994 B2
(45) Date of Patent: May 8, 2018

(54) METHOD AND APPARATUS FOR CLEARANCE CONTROL UTILIZING FUEL HEATING

(71) Applicant: General Electric Company, Schenectady, NY (US)

(72) Inventors: Henry G. Ballard, Jr., Easley, SC (US); Douglas Frank Beadie, Greenville, SC (US); John David Memmer, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 381 days.

(21) Appl. No.: 14/247,593

(22) Filed: Apr. 8, 2014

(65) Prior Publication Data
US 2015/0285088 A1 Oct. 8, 2015

(51) Int. Cl.
*F01D 11/24* (2006.01)
*F02C 7/18* (2006.01)
(Continued)

(52) U.S. Cl.
CPC ............... *F01D 11/24* (2013.01); *F02C 7/185* (2013.01); *F02C 7/224* (2013.01); *F02C 6/08* (2013.01);
(Continued)

(58) Field of Classification Search
CPC .......... F01D 11/20; F01D 11/24; F02C 7/185; F02C 7/244; F02C 7/18; F02C 7/12; F02C 6/08; F05D 2260/20; F05D 2260/213
See application file for complete search history.

(56) References Cited

U.S. PATENT DOCUMENTS 2,474,258 A 6/1949 Kroon
4,163,365 A * 8/1979 Frutschi ............... F02C 9/16
60/39.183
(Continued)

FOREIGN PATENT DOCUMENTS

EP 0 651 145 A1 5/1995
EP 0 715 124 A2 6/1996
(Continued)

OTHER PUBLICATIONS

"Double-Tube Safety Heat Exchangers", Doppelrohrsicherheits-Warmeubertrager, GEA Renzmann & Grunewald GmbH, pp. 1-16, Sep. 2010.
(Continued)

*Primary Examiner* — Gerald L Sung
*Assistant Examiner* — Alain Chau
(74) *Attorney, Agent, or Firm* — Nixon & Vanderhye P.C.

(57) ABSTRACT

A clearance control apparatus providing compressed cooling air to a turbine casing in a gas turbine, the apparatus including: a cooling gas passage extending through an inner annular shell of the turbine casing; a cooling gas conduit connected to a compressor of the gas turbine and to the turbine casing, wherein the cooling gas conduit receives compressed air from the compressor and delivers the compressed air to the turbine casing, and wherein the cooling gas conduit is in fluid communication with the cooling gas passage, and a heat exchanger connected to the cooling gas conduit and to a fuel conduit delivering fuel to a combustor of the gas turbine, wherein the heat exchanger transfers heat from the cooling gas to the fuel.

20 Claims, 3 Drawing Sheets

(51) Int. Cl.
*F02C 7/224* (2006.01)
*F02C 6/08* (2006.01)

(52) U.S. Cl.
CPC .. *F05D 2260/213* (2013.01); *F05D 2260/221* (2013.01)

(56) References Cited

U.S. PATENT DOCUMENTS

| | | | |
|---|---|---|---|
| 4,199,300 A | | 4/1980 | Tubbs |
| 4,318,666 A | | 3/1982 | Pask |
| 4,329,114 A | * | 5/1982 | Johnston ............... F01D 11/24 415/116 |
| 4,338,061 A | * | 7/1982 | Beitler ................... F01D 11/24 415/1 |
| 4,419,044 A | | 12/1983 | Barry et al. |
| 4,471,938 A | * | 9/1984 | Schwarz ............... F16K 31/122 251/25 |
| 4,928,240 A | * | 5/1990 | Davison ................ F01D 11/24 415/116 |
| 5,178,514 A | | 1/1993 | Damiral |
| 5,192,186 A | | 3/1993 | Sadler |
| 5,267,831 A | | 12/1993 | Damiral |
| 5,317,877 A | * | 6/1994 | Stuart ..................... F02C 7/185 60/736 |
| 5,414,992 A | * | 5/1995 | Glickstein ............ B64D 13/006 60/39.83 |
| 6,065,282 A | | 5/2000 | Fukue et al. |
| 6,089,012 A | | 7/2000 | Sugishita et al. |
| 6,179,557 B1 | | 1/2001 | Dodd et al. |
| 6,401,460 B1 | | 6/2002 | Xia |
| 6,415,595 B1 | * | 7/2002 | Wilmot, Jr. ........... B64D 13/006 60/266 |
| 6,416,279 B1 | | 7/2002 | Weigand et al. |
| 6,584,778 B1 | * | 7/2003 | Griffiths ................... F02C 7/14 60/226.1 |
| 6,749,395 B1 | | 6/2004 | Reichert et al. |
| 6,817,187 B2 | * | 11/2004 | Yu ........................... F02C 3/365 60/39.17 |
| 6,968,696 B2 | * | 11/2005 | Little ........................ F01D 5/08 60/772 |
| 7,096,673 B2 | * | 8/2006 | Little ...................... F01D 5/081 60/782 |
| 7,185,495 B2 | * | 3/2007 | Leachman .............. F23L 15/00 60/772 |
| 7,269,955 B2 | * | 9/2007 | Albers ................... F01D 5/082 60/728 |
| 7,445,212 B2 | | 11/2008 | Gail et al. |
| 7,686,569 B2 | * | 3/2010 | Paprotna ................ F01D 11/20 415/1 |
| 7,785,063 B2 | | 8/2010 | McQuiggan et al. |
| 7,823,374 B2 | | 11/2010 | Venkataramani et al. |
| 7,900,437 B2 | | 3/2011 | Venkataramani et al. |
| 8,015,788 B2 | | 9/2011 | Stephenson et al. |
| 8,157,512 B2 | | 4/2012 | Zhang et al. |
| 8,220,275 B2 | | 7/2012 | Tillery |
| 8,602,724 B2 | * | 12/2013 | Takahashi ............. F01D 11/24 415/145 |
| 9,003,807 B2 | * | 4/2015 | Chehab .................. F01D 11/24 60/782 |
| 9,719,372 B2 | | 8/2017 | Ballard, Jr. et al. |
| 2002/0020968 A1 | | 2/2002 | Gail et al. |
| 2002/0130469 A1 | | 9/2002 | Kono |
| 2003/0178778 A1 | | 9/2003 | Szymbor et al. |
| 2007/0189740 A1 | * | 8/2007 | Clements ................ F02C 7/224 392/471 |
| 2008/0069683 A1 | * | 3/2008 | Nigmatulin ............ F01D 11/20 415/1 |
| 2010/0107649 A1 | | 5/2010 | Nilsson |
| 2011/0027068 A1 | * | 2/2011 | Floyd, II ................ F01D 11/24 415/13 |
| 2011/0088405 A1 | * | 4/2011 | Turco ..................... F01D 5/081 60/782 |

FOREIGN PATENT DOCUMENTS

| | | |
|---|---|---|
| GB | 1003950 A | 9/1965 |
| GB | 2 131 094 A | 6/1984 |

OTHER PUBLICATIONS

"Natural Gas Preheaters", GEA Renzmann & Grunewald GmbH, pp. 1-12, Jun. 2008.

D.M. Erickson et al., "Design Consideratios for Heated Gas Fuel", GE Power Systems, GER-4189B, pp. 1-20, Mar. 2003.

Machine Translation and First Office Action and Search issued in connection with corresponding CN Application No. 201510162400.7 dated Jul. 10, 2017.

\* cited by examiner

METHOD AND APPARATUS FOR CLEARANCE CONTROL UTILIZING FUEL HEATING

BACKGROUND OF THE INVENTION

The present invention relates to clearance control in a turbine, such as a gas turbine.

Clearance in a turbine typically refers to the dimension of gaps between the rotor and the stator casing that surrounds the rotor. The rotor is typically an axial turbine having rows of buckets each mounted on a turbine wheel. The wheels are mounted on a shaft of the turbine. The stator casing houses the rotor and includes rows of stationary nozzles positioned between the rows of buckets. Clearance often refers to the annular gap between the tips of the buckets and the stator casing.

Clearance is needed to allow the buckets to rotate without rubbing against the stator casing. If the clearance is too great, combustion gases may leak over the tips of the buckets and do not drive the rotation of the turbine. If the clearance is too small, the tips may rub against the stator casing and may cause vibrations that damage the turbine.

The clearance varies as the turbine is heated and cools during its various operational phases. The variations in clearance are due to thermal expansion and contraction of the components of a turbine. A turbine is typically formed of metal components having different heat expansion rates. The turbine wheels, buckets on the wheels and annular shells around the buckets expand and contract at different rates. Due to different rates of thermal expansion, clearance could increase or shrink as the gas turbine heats and cools.

Clearance is needed whenever the turbine buckets rotate including: while the turbine heats up during startup, as the gas turbine transitions from full speed no load (FSNL) operation to and during full speed full load (FSFL) operation, and as the turbine shuts down. Maintaining adequate clearance during any and all operational phases of a gas turbine is achieved by a clearance control system.

Clearance control systems and techniques provide adequate clearance during all phases of gas turbine operation. Conventional clearance control systems and techniques include cooling systems mounted on external skids adjacent the gas turbine, complex sensing and actuation systems for regulating cooling flow bled from the compressor and used for turbine cooling and external heat transfer systems to heat or cool the cooling air before it enters the turbine. Conventional clearance control systems and techniques tend to be active in that they adjust the amount of a cooling fluid flowing through the shell or buckets. Some active conventional clearance systems are actuated in response to a certain operating conditions, such as at pinch points which occur when clearance is at its narrowest. For example, heating cooling air may be added to the turbine casing to increase the thermal expansion of the casing and thus increase the clearance at a pinch point.

Active clearance control systems are often mechanically complex, expensive and require computer or hydraulic controllers. Passive clearance control systems do not require controllers and tend to be relatively mechanically simple and inexpensive. However, passive controllers typically do not have the ability to adjust the cooling capacity of the cooling gas fed to the turbine. Even in view of the conventional clearance control systems, there remains a long felt need for clearance control systems and techniques that are robust, economical, assure adequate clearance at all phases of gas turbine operation and avoid excessive clearances especially at steady operating phases such as FSFL.

SUMMARY OF INVENTION

An approach to clearance control has been conceived in which fuel is used to cool the coolant used in clearance control. As the coolant flows through the turbine, such as the stator casing and nozzles, the coolant affects the thermal expansion or contraction of the turbine. The amount of thermal expansion or contraction depends on the temperature of the coolant and specifically the difference between the coolant temperature and the temperature of the turbine. Clearance control can be achieved, at least in part, by adjusting the temperature of the coolant. The conceived approach is to adjust the temperature of the coolant by transferring heat between the coolant and the fuel flowing to the combustors of the gas turbine.

The conceived approach may be embodied with a heat exchanger through which passes the coolant and a portion of the fuel flow. The coolant is generally cooled by the fuel flow because the fuel is at lower temperature than the coolant—which may be compressed air extracted from one or more states of the compressor in the gas turbine. The rate of fuel flowing through the heat exchanger affects the amount of cooling of the coolant flowing through the heat exchanger to the turbine. The greater the fuel flow the lower the temperature of the coolant flowing to the turbine.

The flow rate of fuel increases to transition the gas turbine from full speed, no load (FSNL) to full speed, full load (FSFL). As the fuel flow rate increases, there is a similar increase in the cooling, e.g., reduced temperature, of the coolant. The increased cooling reduces the capacity of the coolant to heat and thermally expand the turbine casing during FSFL operation. The reduced capacity results in a reduction in the clearance at FSFL that would otherwise occur if the coolant was not cooled by the fuel.

While the fuel flow is relatively low, the coolant is cooled to a much lesser extend than when the fuel flow is high. During low fuel flow, the coolant remains relatively hot and thus causes the turbine casing to thermally expand to a greater extent than if the coolant had been cooled by a greater fuel flow. Allowing the turbine casing to thermally expand during low fuel flow may be used to increase the clearance while the fuel flow is low such as during FSNL.

By using fuel flow to cool the coolant flowing to the turbine casing, a passive clearance control system may be configured that allows for increased clearance during low fuel flow operations and reduced clearance during high fuel flow operations. This ability may be useful for gas turbines having clearance pinch points during low fuel flow operations.

The clearance control system may be formed by providing a heat exchanger through which passes the compressed coolant flow extracted from the compressor and a portion of the fuel flow. The clearance control system relies on variations in fuel flow to change the amount of cooling of the coolant flow. The clearance control system may be embodied without valves, actuators or other active control devices.

A clearance control apparatus has been conceived to provide compressed cooling air to a turbine casing in a gas turbine, the apparatus including: a cooling gas passage extending through an inner annular shell of the turbine casing; a cooling gas conduit connected to a compressor of the gas turbine and to the turbine casing, wherein the cooling gas conduit receives compressed air from the compressor and delivers the compressed air to the turbine casing, and wherein the cooling gas conduit is in fluid communication with the cooling gas passage, and a heat exchanger connected to the cooling gas conduit and to a fuel conduit delivering fuel to a combustor of the gas turbine, wherein the heat exchanger transfers heat from the cooling gas to the fuel.

A gas turbine has been conceived that includes: a turbine casing enclosing a rotating turbine in the gas turbine; a fuel conduit connectable to a supply of fuel and to a combustor of the gas turbine, wherein fuel flows through the fuel conduit from the fuel supply to the combustor; a cooling gas conduit connected to a compressor of the gas turbine and to the turbine casing, wherein the cooling gas conduit receives compressed air from the compressor and delivers the compressed air to an internal passage in the turbine casing, and a heat exchanger connected to the fuel conduit and to the cooling gas conduit, wherein the heat exchanger transfers heat from the cooling gas to the fuel.

A method has been conceived for clearance control in a gas turbine having a compressor, combustor, turbine and a turbine casing housing the turbine, the method comprising: extracting compressed air from the compressor; cooling the compressed air in a heat exchanger wherein heat from the compressed air is transferred to fuel flowing to the combustor, and modulating a gap between the turbine casing and a rotating section of the turbine by the passing the cooled compressed air through a passage turbine casing.

DETAILED DESCRIPTION OF THE INVENTION

Figure 1:
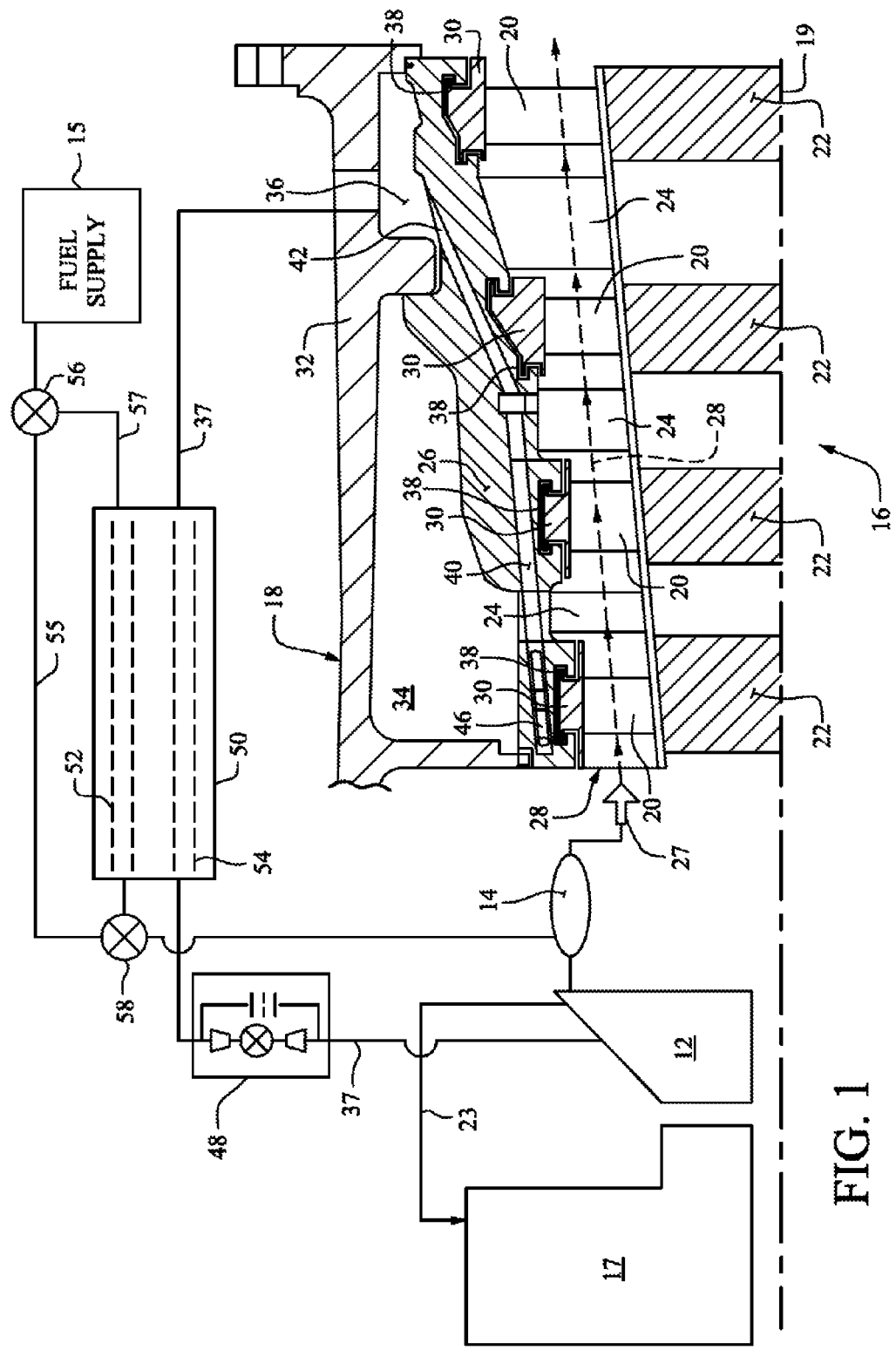
FIG. 1 is a schematic diagram of a gas turbine showing a cut-away view of the turbine and turbine shell.

FIG. 1 shows a gas turbine 10 having a compressor 12, combustor 14 and turbine 16. An inlet duct 17 provides a passage for air to enter the gas turbine and be directed to the inlet to the compressor.

Gas turbines generate power by compressing air, mixing the compressed air with fuel 15, combusting the mixture and driving a turbine with combustion gases. The turbine includes an annular casing 18 that houses rows of turbine buckets 20 (also referred to as blades) that rotate about a shaft 19. The buckets in each row are mounted on a turbine wheel 22. Between the rows of buckets are rows of stationary nozzles 24 (also referred to as guide vanes. Hot combustion gases 27 (see arrow) flow in an annular hot gas passage 28 through the rows of buckets 20 and nozzles 24. The turbine casing 18 forms the outer surface of the hot gas passage 28. The inner wall of the passage 28 is near the outer rims of the wheels 22.

A conduit 23 for compressed air extracted from the compressor directs air from the outlet (last stage) of the compressor to the inlet duct 17. The conduit 23 is included in an inlet bleed heat (IBH) system used while the gas turbine is operating under a no-load or low load condition. By diverting compressed air from the combustor and to the inlet to the compressor, the IBH system reduces the compressor efficiency so that the gas turbine will operate in a self-sustaining manner with no or minimal load. A gas turbine is self-sustaining when the turbine is driven solely by the hot combustion gases formed in the combustor. If the compressor efficiency is not reduced, a much greater load would need to be applied to a self-sustaining gas turbine to avoid undesired increases in the speed of the turbine. Adding the compressed air to the inlet air, the IBH system (conduit 23) heats the compressed air entering the compressor.

The turbine casing 18 includes an outer annular shell 32 that houses and supports an inner annular shell 26. The inner annular shell surrounds the rows of buckets and nozzles. The nozzles 24 are mounted to the inner annular shell 26. Annular rows of shrouds 30 are mounted to the inner turbine shell 26 and aligned with the tips of the buckets. The gap between the shrouds 30 and the tips of the buckets 20 is referred to as the "clearance" or "clearance gap" of the gas turbine.

A small clearance ensures that minimal amounts of hot combustion gases leak over the tips of the buckets. If the clearance becomes too small, the tips of the bucket scrape against the shrouds which causes wear to the buckets and shrouds, and can create vibrations in the turbine. Wear is generally not desired as it increases the clearance gap and can lead to damage to the buckets and shrouds. Vibrations are generally not desired because they can damage the turbine.

Annular plenums 34, 36 are formed between the outer and inner annular shells 32, 26 of the turbine casing 18. These plenums 34, 36 distribute compressed air delivered by compressed air conduit 37 to cooling passages 40 in the inner annular shell 26 and extending through the nozzles 24. The compressed air is extracted from one or more stages of the compressor 12 and flows through the conduit 37. The plenum 34 around the earlier stage buckets receives air compressed to a higher degree and from a later stage of the compressor than the compressed air received by the plenum 36 surrounding a later stage turbine. The arrangement and number of plenums in the turbine shell 18 and the selection of compressor stages to be coupled to each of the plenum is a matter of design choice.

Figure 2:
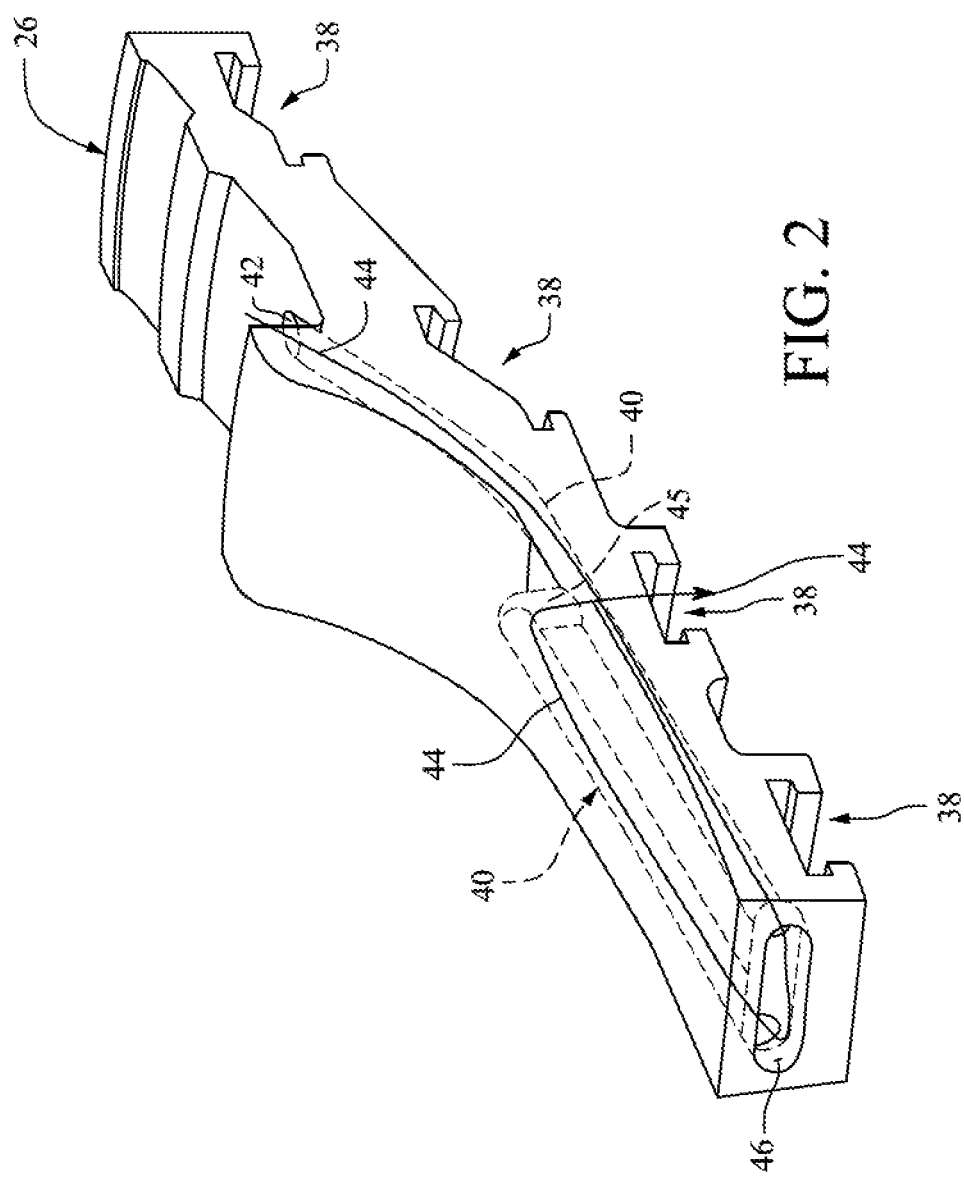
FIG. 2 is a perspective view of a portion of an exemplary inner annular shell of a turbine casing.

FIG. 2 is a perspective view of a section of the annular inner annular shell 26. The inner annular shell is typically formed of a metal material. The outer surface of the shell has annular ledges and ribs that engage the outer annular shell 32. The outer surface of the inner annular shell forms an outer wall of the plenums 34, 36 (FIG. 1). An inner wall of the plenums is formed by the inner annular shell 26. Radially inward surfaces of the inner annular shell include rows of slots 38 to receive hooks of the shrouds 30.

Internal cooling passages 40 (see dotted lines) are arranged within the inner turbine shell. Compressed air from one of the annular plenums 34, 36, enters an inlet 42 to a cooling passage, such as cooling passages 40. Air flows through the passages (see serpentine arrow 44) and exits 45 into a slot 38. The cooling passages 40 may be arranged to extend longitudinally along the rotational axis of the gas turbine. The cooling passages may follow a serpentine, e.g., switch-back, course by reversing direction at a cross-over pocket chamber 46 near an axial end of the inner annular shell. Several cooling passages 40 may be arranged symmetrically around the circumference of the turbine shell. The cross-over pocket chamber may be sealed by a plate 47 (FIG. 4) on the forward face of the inner annular shell. The arrangement of the cooling passages in the shell is a matter of design choice and within the skill of an engineer experienced in design turbine shells.

Heat transfer occurs between the inner turbine shell 26 and the compressed air as the air flows through the cooling passages 40. The compressed air cools the inner turbine shell if the shell is at a higher temperature than the compressed air. The turbine shell is typically hotter than the compressed air because hot combustion gas flows through the hot gas passage 28 and heats the inner turbine shell.

The compressed air from conduit 37 flows from the compressor 13 through a compressor extraction modulation valve 48 that regulates the flow of compressed air taken from the compressor and directed to the turbine casing. The modulation valve may be a conventional parallel arrangement of an adjustable valve and a fixed orifice. The adjustable valve may be set to a fixed position during operation of the gas turbine. Or, the adjustable valve 48 may be controlled during gas turbine operation to provide more or less cooling air to the turbine casing. Compressor extraction modulation valves are conventional.

The compressed air in conduit 37 passes through a heat exchanger 50 as the air flows to the turbine casing. Fuel 15 also flows through the heat exchanger. Heat is transferred through the heat exchanger from the compressed air 37 to the fuel. Heating fuel, especially gas fuel, is conventional and is used to improve the efficiency of a gas turbine by reducing the amount of fuel needed to reach a desired firing temperature in the combustor. It is not conventional to heat fuel with compressed air used for clearance control in a turbine.

The heat exchanger 50 may be a double tube heat exchanger which ensures that any leakage of fuel does not allow fuel to mix and potentially combust with the compressed air flowing through the heat exchanger. Double tube heat exchangers are conventional and well suited to transfer heat between fuel for a gas turbine and compressed air. In a double tube heat exchanger, the fuel and compressed air may flow through separate tubes 52, 54 within the exchanger. A conductive material, such as a fluid or metal, within the heat exchanger transfers heat between the tubes. For example, a condensing fluid in the heat exchanger may be vaporized by the compressed air and condensed by the fuel. A condensing fluid provides an effective and high capacity media for transferring heat between the compressed air and fuel.

A double walled heat exchanger may also be used as the heat exchanger 50. A double walled heat exchanger has two walls separating the fuel from the compressed air. Due to the double walls, a leak in one of the walls will not result in the compressed air and fuel mixing in the heat exchanger. The volume of the heat exchanger between the walls may be filled with a solid, liquid or gas that conducts heat between the tubes having fuel and the tubes having compressed air.

A portion of the fuel 15 is directed through the heat exchanger 50. Fuel flows from the fuel supply 15 through a conduit 55 to the combustor 14 of the gas turbine. A portion of the fuel is diverted by a flow diverter 56, such as a one inlet/two outlet valve. The flow diverter may be set at a fixed operating position such that a constant portion of the fuel is diverted through the heat exchanger during all operational phases of the gas turbine. A second flow diverter 58 is downstream of the heat exchanger and merges the fuel flowing through the heat exchanger with the fuel flowing through the conduit 52. The first and second flow diverters 56, 58 divert a portion of the fuel flow through a fuel conduit 57 that extends from the flow diverter 56, through the heat exchanger 50 and to flow diverter 58.

Figure 3:
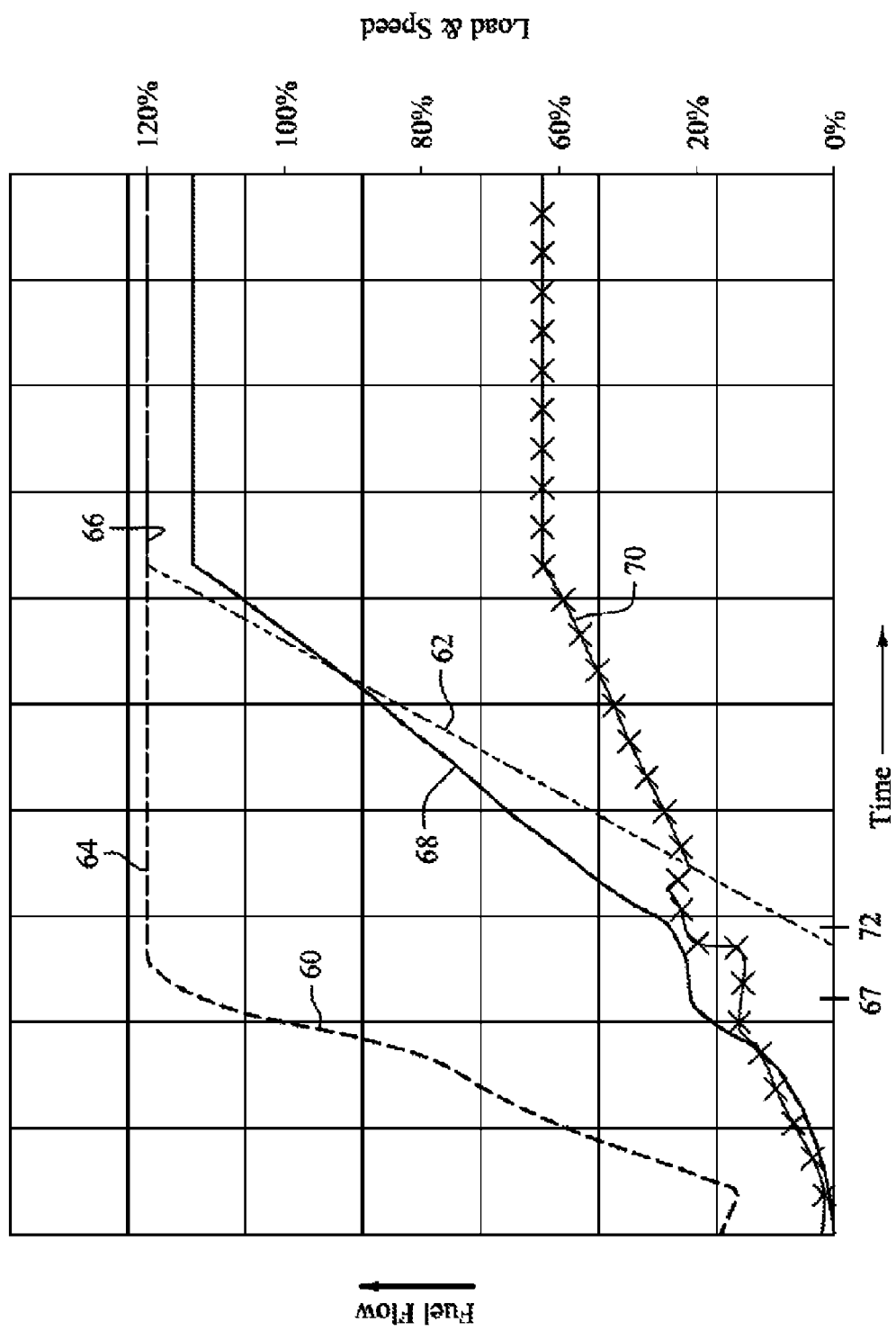
FIG. 3 is a chart showing an exemplary transition from full speed, no load (FSNL) to full speed, full load (FSFL) in an industrial gas turbine.

FIG. 3 is a chart showing the rate of fuel flow in an exemplary industrial gas turbine transitioning from full speed, no load (FSNL) to full speed, full load (FSFL). This transition is typically included in the operation of a gas turbine. The transition occurs after the gas turbine has been started and is self-sustaining by combusting fuel. In an exemplary transition, the rotational speed 60 of the gas turbine is accelerated from about twenty percent (20%) to one-hundred percent (100%) of full speed operation. During the initial portion of the transition, no load 62 is applied to the gas turbine. The load 62 may be applied by an electrical generator coupled to the drive shaft. The electrical generator applies a torque to the drive shaft that is overcome by the torque generated by the gas turbine. Shortly after the gas turbine reaches full speed 64, the load 62 may gradually increase until the load reaches 100 percent 66. Just before 67 or as the load is applied to the gas turbine accelerates, the inlet bleed heat (IBH) system reduces or shuts off the flow of compressor air through conduit 37 (FIG. 1) to the inlet of the gas turbine.

The increase in speed 60 is a result of increasing the rate 68 of fuel flow. The fuel flow rate 68 also increases as the load 62 is applied to the gas turbine. The fuel flow rate reaches a maximum in conjunction with the gas turbine reaching a FSFL condition. The rate 70 of coolant flow also increases with the increase in the fuel flow rate 68. The coolant flow is extracted from the compressor. As the compressor speed increases and the load on the gas turbine increases, the amount of working fluid, e.g., air, flowing from the compressor into the combustor increases to cause the turbine to produce more work to drive the load. When the load is not applied during FSFL, a portion of the compressor outlet air is diverted to the front of the compressor as inlet bleed heat (IBH). As the IBH is turned off (point 67), the rate 70 of the coolant extracted from the compressor increases. In this example, the coolant flow rate 70 increases at approximately one-half of the rate 68 at which the fuel flow increases. This difference in rates affects the amount of cooling of the coolant in the heat exchanger 50. The amount of cooling of the coolant increases as the rate of fuel flow increases more rapidly than the rate of the coolant.

The turbine may have a "pinch point" 72 during the transition from FSNL to FSFL. A pinch point is where the clearance between the thermal expansions of the rotating and stationary components becomes narrowest during an operation of the gas turbine. Using the fuel to cool the coolant is an effective and simple technique to provide clearance control at the pinch point 72 during the FSNL to FSFL transition and reduce the clearance during FSFL.

A gas turbine is designed to provide a suitable clearance gap at a pinch point, even if the pinch point occurs for a short period during a transition from FSNL to FSFL. The design requirement that a suitable clearance at the pinch point may result in a larger than desired clearance at operation conditions other than at the pinch point. For example, the clearance at a FSFL may be greater than is desired so that the clearance is adequate at a pinch point. A greater than necessary clearance during a FSFL or other steady state operating condition potentially could reduce the efficiency of the gas turbine for extended periods of operation.

The greater rate of fuel flow 68 at FSFL provides greater cooling of the coolant at FSFL as compared to the cooling at FSNL and at the pinch point 72. The clearance at FSFL and other operating conditions may be reduced by cooling the compressed air with fuel is to reduce the clearance between the stationary and rotating components of the gas turbine. Cooling the compressed air 37 flowing into the cooling passage 40 results in the greater cooling of the inner annular shell. The greater cooling will reduce the thermal expansion of the annular shell and shrink the clearance between the annular shell and the rotating components of the turbine.

The amount of cooling of the compressed air depends on the amount of fuel flowing through the heat exchanger. The greater the fuel flow, the greater amount of cooling of the compressed air. The relationship between the fuel flow and the amount of cooling of the compressed air may be exploited for the benefit of clearance control. The exploitation may be embodied by cooling of the coolant with the fuel flow to modulate the clearance gap between the tips of the buckets and the shrouds attached to the inner annular shell. The modulation may include minimizing the cooling of the coolant while the fuel flow is relatively low, such as during FSNL. Minimizing the cooling of the coolant during FSNL may be used to ensure that at a pinch point the gap does not become too narrow. The modulation may also include increasing the cooling of the coolant while the fuel flow is increased to ensure that the gap does not become too great during FSFL.

For example, the fuel flow increases dramatically as the gas turbine transitions from full speed, no load (FSNL) to full speed, full load (FSFL). The cooling of the compressed air in the heat exchanger increases in coordination with the increase in the fuel flow. The increasing cooling is applied to provide greater cooling of the inner annular shell as the gas turbine approaches and runs at FSFL as compared to the cooling of the inner annular shell while the gas turbine is at and near FSNL.

The increased cooling of the inner annular shell due to an increase in fuel flow may be applied to maintain a desired clearance at and near FSFL while providing sufficient clearance at a pinch point at or near FSNL. At FSNL, the rate of fuel flow is relatively low and the amount of cooling in the heat exchanger of the compressed air is small. The small amount of cooling of the compressed air is desired if the gas turbine has a pinch point at or near FSNL. To provide adequate clearance at the pinch point, it is helpful to allow the inner annular shell to thermally expand while the gas turbine is at the pinch point. As the gas turbine transitions beyond the pinch point, the increasing fuel flow results in greater cooling of the compressed air that cools the inner annular shell. The greater cooling slows the thermal expansion of the inner annular shell and minimizes the clearance as the gas turbine reaches FSFL.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine comprising:
   a turbine casing enclosing a rotating turbine in the gas turbine;
   a fuel conduit connectable to a supply of fuel and to a combustor of the gas turbine, wherein fuel flows through the fuel conduit from the fuel supply to the combustor at a fuel flow rate;
   a cooling gas conduit connected to a compressor of the gas turbine and to the turbine casing, wherein the cooling gas conduit receives compressed air from the compressor and delivers the compressed air to an internal passage in the turbine casing;
   a heat exchanger connected to the fuel conduit and to the cooling gas conduit, wherein the heat exchanger transfers heat from the compressed air to the fuel flow to form a cooling gas to be delivered to the turbine casing, and
   a modulation valve configured to modulate the cooling gas flowing into the heat exchanger and into the internal passage in the turbine casing, wherein the modulation valve is at a first setting during a full-speed, full load (FSFL) operational stage of the gas turbine and at a second setting during a full-speed, no load (FSNL) operational stage of the gas turbine, such that the modulation valve receives compressed air from the compressor and delivers the compressed air into the heat exchanger at a cooling gas flow rate during both the FSNL operational stage and the FSFL operational stage, and
   a computer controller configured to operate the modulation valve during a transition from the FSNL operational stage to the FSFL operational stage, wherein both the cooling gas flow rate into the heat exchanger and the internal passage in the turbine casing and the fuel flow rate increase during said transition, such that a rate of increase of the cooling gas flow rate is controlled to be less than a rate of increase of the fuel flow rate during said transition.

2. The gas turbine of claim 1 wherein
   the fuel conduit includes a main conduit and a bypass conduit, wherein the bypass conduit is coupled to the heat exchanger and forms a passage for the fuel flowing through the heat exchanger, and the bypass conduit has an inlet and an outlet for the fuel with are both connected to the main conduit.

3. The gas turbine of claim 1 wherein
   the heat exchanger is a doubled tube heat exchanger including a first tube connected to the fuel conduit and forming a passage for the fuel flowing through the heat exchanger and a second tube connected to the cooling gas conduit and forming a passage for the cooling gas flowing through the heat exchanger.

4. The gas turbine of claim 1 wherein
   the heat exchanger is a doubled wall heat exchanger including at first and second wall separating the fuel flowing through the heat exchanger from the cooling gas flowing through the heat exchanger.

5. The gas turbine of claim 1 further comprising
   an inlet duct having an outlet configured to direct air into the compressor, and an inlet bleed heat (IBH) conduit coupled to the compressor and the inlet duct, wherein the IBH conduit is configured to direct compressed air from the compressor to the inlet duct.

6. The gas turbine of claim 1 wherein
   the internal passage is a passage in an inner annular shell of the turbine casing.

7. The gas turbine of claim 6 wherein
   the internal passage extends at least one-half of a length of the inner annular shell.

8. A clearance control apparatus providing compressed cooling air to a turbine casing in a gas turbine, the apparatus comprising:
   a cooling gas passage extending through an inner annular shell of the turbine casing;
   a cooling gas conduit connected to a compressor of the gas turbine and to the turbine casing, wherein the cooling gas conduit receives compressed air from the compressor and delivers the compressed air as a cooling gas to the turbine casing, and wherein the cooling gas conduit is in fluid communication with the cooling gas passage;
   a heat exchanger connected to the cooling gas conduit and to a fuel conduit delivering fuel at a fuel flow rate to a combustor of the gas turbine, wherein the heat exchanger transfers heat from the compressed air to the fuel to form the cooling gas to be delivered to the turbine casing, and a modulation valve configured to modulate the compressed air flowing into the heat exchanger and into the cooling gas passage extending through the inner annular shell, wherein the modulation valve is at a first setting during a full-speed, full load (FSFL) operational stage of the gas turbine and at a second setting during a full-speed, no-load (FSNL) operational stage of the gas turbine, such that the modulation valve receives compressed air from the compressor and delivers the compressed air into the heat exchanger at a cooling gas flow rate during both the FSNL operational stage and the FSFL operational stage, and a computer controller configured to control the modulation valve during a transition from the FSNL operational stage to the FSFL operational stage, wherein both the cooling gas flow rate into the heat exchanger and the internal passage in the turbine casing and the fuel flow rate increase during the transition, such that a rate of increase of the cooling gas flow rate is controlled to be less than a rate of increase of the fuel flow rate during the transition.

9. The clearance control apparatus of claim 8 wherein the fuel conduit includes a main conduit and a bypass conduit, wherein the bypass conduit is coupled to the heat exchanger and forms a passage for the fuel flowing through the heat exchanger, and the bypass conduit has an inlet and an outlet for the fuel with are both connected to the main conduit.

10. The clearance control apparatus of claim 8 wherein the heat exchanger is a doubled tube heat exchanger including a first tube connected to the fuel conduit and forming a passage for the fuel flowing through the heat exchanger and a second tube connected to the cooling gas conduit and forming a passage for the cooling gas flowing through the heat exchanger.

11. The clearance control apparatus of claim 8 wherein the heat exchanger is a doubled wall heat exchanger including at first and second wall separating the fuel flowing through the heat exchanger from the cooling gas flowing through the heat exchanger.

12. The clearance control apparatus of claim 8 wherein the gas turbine includes an inlet duct having an outlet configured to direct air into the compressor, and an inlet bleed heat (IBH) conduit coupled to the compressor and the inlet duct, wherein the IBH conduit is configured to direct compressed air from the compressor to the inlet duct.

13. The clearance control apparatus of claim 8 wherein the cooling gas passage extends at least one-half of a length of the inner annular shell.

14. A method for clearance control in a gas turbine having a compressor, combustor, turbine, modulation valve and a turbine casing housing the turbine, the method comprising:
extracting compressed air from the compressor;
cooling the compressed air in a heat exchanger to form a cooled compressed air, wherein heat from the compressed air is transferred to fuel flowing at a fuel flow rate to the combustor;

modulating a gap between the turbine casing and a rotating section of the turbine by passing the cooled compressed air through a passage in the turbine casing, wherein the modulation of the gap includes increasing a rate of the compressed air passing into the heat exchanger and into the turbine casing during a first operational mode of the gas turbine and reducing the rate of compressed air passing through the heat exchanger and the turbine casing during a second operational mode of the gas turbine, wherein the first operational mode is while the gas turbine operates at full-speed, full load (FSFL) and the second operational mode is while the gas turbine operates at full speed, no-load (FSNL), wherein the modulation valve receives the compressed air from the compressor and delivers the received compressed air to the heat exchanger during both the FSNL and the FSFL operation stage to form the cooled compressed air to be delivered to the turbine casing, wherein during a transition from the second operational mode to the first operational mode, the fuel flow rate is increased; and using a computer controller configured to operate the modulation valve during the transition from the second operational mode to the first operational mode such that a rate of increase of the rate of the compressed air passing into the heat exchanger and into the turbine casing is controlled to be less than a rate of increase of the fuel flow rate during said transition.

15. The method of claim 14 wherein
the passage in the turbine casing is a passage through an inner annular shell and the passage extends at least one-half a length of the annular shell.

16. The method of claim 14 wherein
the method further comprises transitioning the gas turbine from the full speed, no load condition to the full speed, full load condition while performing the steps of extraction, cooling and modulating.

17. The method of claim 16 further comprising
diverting compressed air output by the compressor from the combustor and to an inlet duct for the compressor during the full speed, no load condition and not diverting the compressed air to the inlet duct during the transition.

18. The method of claim 14 wherein
the cooling of the compressed air is performed with a portion of the fuel flowing to the combustor, and the method further comprises diverting the portion of the fuel from a main fuel conduit into a bypass conduit, wherein the bypass conduit is coupled to the heat exchanger and forms a passage for the fuel flowing through the heat exchanger.

19. The method of claim 18 wherein the portion of the fuel diverted to the heat exchanger remains proportionately constant with respect to a total fuel flow to the combustor during operation of the gas turbine.

20. The method of claim 14 wherein
the first operational mode corresponds to an operational mode of the gas turbine where the gap is expected to be at a minimum.

* * * * *

UNITED STATES PATENT AND TRADEMARK OFFICE
CERTIFICATE OF CORRECTION

PATENT NO.         : 9,963,994 B2
APPLICATION NO.    : 14/247593
DATED              : May 8, 2018
INVENTOR(S)        : Ballard, Jr. et al.

Page 1 of 1

It is certified that error appears in the above-identified patent and that said Letters Patent is hereby corrected as shown below:

In the Specification

Column 3, Line 53, "vanes" should read --vanes)--

Column 6, Line 60, "compressed air" should read --compressed air 37--

Signed and Sealed this
Third Day of July, 2018

Andrei Iancu
*Director of the United States Patent and Trademark Office*